No. 636,988. Patented Nov. 14, 1899.
G. HERBURGER.
DINNER BUCKET.
(Application filed June 23, 1899.)
(No Model.)
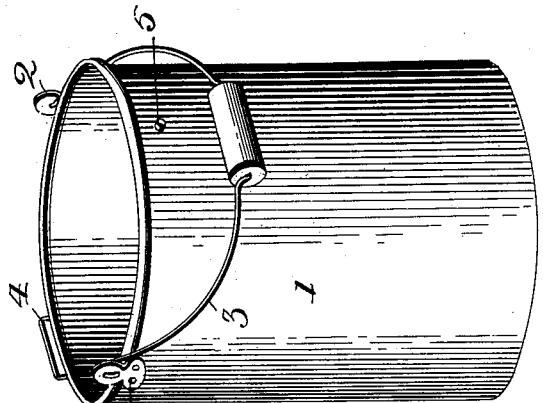
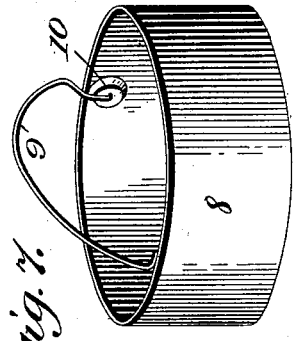
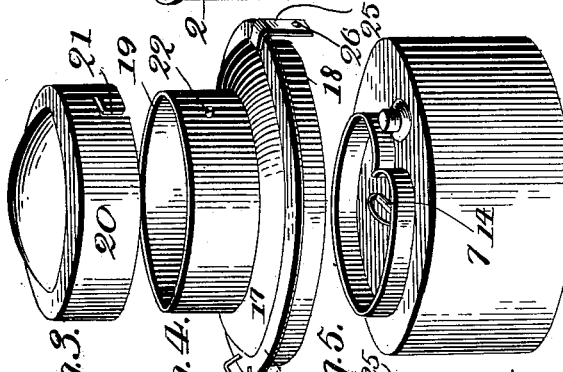
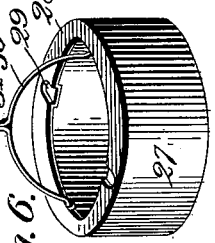
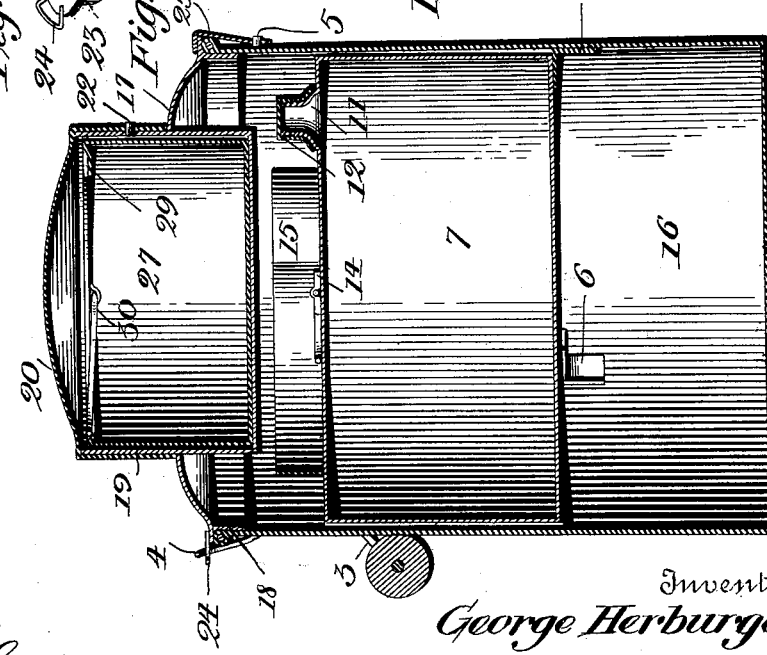
Witnesses:
L. C. Hills.
F. C. Burg
Inventor:
George Herburger;
By H. C. Evert &Co Attorneys
THE NORRIS PETERS CO., PHOTO-LITHO., WASHINGTON, D. C.

UNITED STATES PATENT OFFICE.

GEORGE HERBURGER, OF LINCOLN, ILLINOIS.

DINNER-BUCKET.

SPECIFICATION forming part of Letters Patent No. 636,988, dated November 14, 1899.

Application filed June 23, 1899. Serial No. 721,555. (No model.)

*To all whom it may concern:*

Be it known that I, GEORGE HERBURGER, a citizen of the United States of America, residing at Lincoln, in the county of Logan and State of Illinois, have invented certain new and useful Improvements in Dinner-Buckets, of which the following is a specification, reference being had therein to the accompanying drawings.

This invention relates to certain new and useful improvements in dinner-buckets, and has for its object to construct a bucket or pail of this class that will be extremely simple in its construction, strong, durable, and comparatively inexpensive to manufacture.

A further object of the invention is to construct a bucket or pail of this class having several removable sections or parts adapted to fit within the bucket or pail proper in a neat and compact manner.

A still further object of the invention is to construct a dinner bucket or pail with means for supporting a canteen in the interior of the bucket or pail and to provide a supplemental vessel, which I term a "dinner-piece," that may be used in lieu of the canteen, if desired.

The invention further consists in the novel construction, combination, and arrangement of parts, to be hereinafter more specifically described and then particularly pointed out in the claim, and in describing the invention in detail reference will be had to the accompanying drawings, forming a part of this specification, and wherein like numerals of reference will be employed for designating similar parts throughout the several views, in which—

Figure 1 is a vertical sectional view of my improved dinner bucket or pail with the several parts in their respective positions. Fig. 2 is a perspective view of the bucket or pail proper, with the several parts removed. Fig. 3 is a perspective view of the removable top or cap. Fig. 4 is a perspective view of the lid. Fig. 5 is a perspective view of the canteen. Fig. 6 is a perspective view of the removable cup which fits within the removable lid, and Fig. 7 is a perspective view of the supplemental pail or dinner-piece.

Referring now to the drawings by reference-numerals, 1 designates the bucket or pail, which may be of any desired shape and size and is provided with the usual ears or lugs 2 for attaching thereto an ordinary bail 3. This bucket or pail has secured to its outer face, at a point diagonally opposite the two ears or lugs 2, a stirrup or keeper 4, which projects above the rim of the bucket or pail and is adapted to form a part of the fastening for securing the lid in position. On the opposite side from the stirrup or keeper 4 the bucket or pail carries a stud or pin 5, located a short distance below the rim, and which also forms a part of the fastening means, and the particular function of which will be hereinafter more specifically described.

Secured to the inner face of the bucket or pail is a series of supporting-brackets 6, which are preferably secured at a point near or slightly below the center of the bucket or pail and are employed for supporting the canteen 7 or the supplemental vessel or dinner-piece 8, as desired. The supplemental vessel or dinner-piece 8 is provided with an ordinary bail 9, the ends thereof being preferably journaled in sockets 10, provided therefor on opposite sides of the inner face of the vessel 8, with the bail adapted to fold or lie within the vessel, so as to be out of the way when the latter is in position in the bucket or pail.

The canteen 7 is adapted to be of a size which will fit neatly within the bucket or pail 1, as shown in Fig. 1 of the drawings, and is adapted to rest upon and be supported by the brackets 6. It is provided with a suitable spout 11, which is or may be closed by a suitable screw-cap 12, and has secured to its top for ease in manipulation a suitable handle 14, adapted to fold flat upon the top of the canteen when not in use. To protect the top and spout of this canteen from injury by pressure thereon, I preferably secure to the said top a flange 15, which may be circular, heart-shaped in its outline, or irregular, as desired, and is preferably of a height sufficient to extend slightly above the screw-cap 12. By supporting the canteen 7 from the brackets 6 a space 16 is formed in the bottom of the bucket or pail, in which the victuals may be placed previously to placing the canteen in the bucket or pail. The supplemental vessel or dinner-piece 8 may also be made of a circumference equal to that of the canteen 7, and will therefore, when used, rest upon the brackets 6 in the same manner, or, if desired, these brackets 6 may be dispensed with and the dinner-piece placed upon the flange 15 of the canteen, the latter being placed in the bottom of the bucket or pail. In lieu of this arrangement I may construct the supplemental vessel or dinner-piece of a less diameter than the canteen, so that the same will pass down into the bottom of the bucket or pail without engagement with the brackets 6 and still employ the latter for supporting the canteen in the manner shown in Fig. 1 of the drawings.

The lid 17 of my improved bucket or pail is preferably made concavo-convexo in form and is provided with the ordinary downwardly-extending flange 18, adapted to fit within the bucket or pail 1. Centrally arranged within this lid and rigidly secured thereto is a cup 19, which extends downwardly about half its length below the lid and forms a convenient receptacle for fruit, berries, or the like. The portion of this cup 19 that extends above the lid 17 is adapted to receive the top or closure-cap 20, which fits neatly thereon, and is provided in one side with a bayonet-shaped slot 21, adapted to engage and lock with a pin or stud 22, secured at a suitable point in the side of the cup 19. Secured to the circumferential flange 23 of this lid, which rests upon the rim or top of the bucket or pail 1, is a catch 24, extending outwardly from the said flange and which is adapted to enter the stirrup or keeper 4, carried by the bucket or pail. This catch 24 is retained in engagement with the stirrup or keeper 4 by securing to the flange 23, at the opposite side thereof from the catch 24, a spring-clasp 25, L-shaped in form and provided in the downwardly-extending portion thereof with an aperture 26, which is adapted to receive the stud or pin 5, secured to the bucket or pail, and thereby lock the lid in position. When it is desired to remove the lid, an outward pull on the lower end of the spring-clasp 25 will disengage the same from the stud or pin 5, and the upward lifting of the lid at this side withdraws the catch 24 from engagement with the stirrup or keeper 4.

Instead of employing the cup 19 directly for the reception of such food as berries, relishes, jellies, and the like, I have found it desirable to employ a removable cup 27, shown in position in the cup 19 in Fig. 1 of the drawings and shown in detail in Fig. 6 thereof. This cup 27 is adapted to fit neatly within the cup 19 and is provided around its top with an inwardly-extending circumferential flange 28, having recesses 29 arranged in opposite sides. A bail 30 is journaled in the inside of this cup and at the center of its bow is preferably forced together to form a projection, as shown at 31. The bail proper falls within the flange 28, while the projection 31 is adapted to seat within one or the other of the recesses 29 in order to prevent the bail from falling entirely within the cup. This projection forms a catch by means of which the bail may be raised to be grasped for removing the cup.

It will be observed that the parts may be used in either of the manners heretofore described, and when in position in the bucket or pail proper are in a neat and compact form, and, further, that various changes may be made in the details of construction without departing from the general spirit of my invention.

Having fully described my invention, what I claim as new, and desire to secure by Letters Patent, is—

A dinner bucket or pail consisting of a bucket or pail proper provided on its one side with a stirrup or keeper extending above the top thereof, and on the opposite side with a stud or pin, brackets secured to the inner face of said bucket or pail, a canteen adapted to fit within the bucket or pail and rest upon said brackets, said canteen being provided with a spout and having a flange on its top which extends above said spout, a lid adapted to fit upon said bucket or pail, a cup rigidly secured within said lid and extending above and below the same, a removable cup adapted to fit within said rigidly-secured cup, a removable top or closure-cap adapted to fit upon the top of the rigidly-secured cup of the lid, means for securing the top or closure-cap to the rigidly-secured cup, a catch secured to one side of the lid and adapted to enter the stirrup of the bucket or pail, and a spring-clasp secured to the opposite side of the lid and adapted to engage the stud or pin carried by the bucket or pail to retain the lid in position, substantially as herein shown and described.

In testimony whereof I affix my signature in the presence of two witnesses.

GEORGE HERBURGER.

Witnesses:
ELMER H. SANFORD,
JOHN J. COSSITT.